United States Patent
Hsieh et al.

(10) Patent No.: US 8,149,222 B2
(45) Date of Patent: Apr. 3, 2012

(54) ELECTRONIC DEVICE CONFIGURED TO RECEIVE TOUCH SENSOR

(75) Inventors: Kun-Chih Hsieh, Taipei Hsien (TW); Jian-Qiang Zhao, Shenzhen (CN); Wen-Hsing Lin, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 641 days.

(21) Appl. No.: 12/344,575

(22) Filed: Dec. 28, 2008

(65) Prior Publication Data

US 2009/0231292 A1 Sep. 17, 2009

(30) Foreign Application Priority Data

Mar. 14, 2008 (CN) .......................... 2008 1 0065853

(51) Int. Cl.
*G06F 3/041* (2006.01)

(52) U.S. Cl. ....................................................... 345/173

(58) Field of Classification Search ........................ None
See application file for complete search history.

(56) References Cited

U.S. PATENT DOCUMENTS

| | | | | |
|---|---|---|---|---|
| 5,515,083 A * | 5/1996 | Casebolt et al. | .............. | 345/175 |
| 6,002,582 A * | 12/1999 | Yeager et al. | ............ | 361/679.21 |
| 6,016,134 A * | 1/2000 | Ota | .............. | 345/104 |
| 6,507,484 B2 * | 1/2003 | Fukuyoshi | .............. | 361/679.26 |
| 6,982,432 B2 * | 1/2006 | Umemoto et al. | .............. | 257/12 |
| 7,453,686 B2 * | 11/2008 | Elberbaum | ............. | 361/679.27 |
| 2002/0080113 A1 * | 6/2002 | Kim | ............................ | 345/156 |
| 2003/0155577 A1 * | 8/2003 | Koizumi | ........................ | 257/80 |
| 2003/0210237 A1 * | 11/2003 | Nasu | .............. | 345/173 |
| 2007/0236473 A1 * | 10/2007 | Hong et al. | .................... | 345/173 |
| 2007/0257893 A1 * | 11/2007 | Philipp et al. | ................. | 345/173 |
| 2008/0117182 A1 * | 5/2008 | Um et al. | ...................... | 345/173 |
| 2009/0174687 A1 * | 7/2009 | Ciesla et al. | .................. | 345/174 |

FOREIGN PATENT DOCUMENTS

| | | |
|---|---|---|
| CN | 1467544 A | 1/2004 |
| CN | 1230723 C | 12/2005 |
| TW | M284964 | 1/2006 |

* cited by examiner

*Primary Examiner* — Peter Vincent Agustin
(74) *Attorney, Agent, or Firm* — Altis Law Group, Inc.

(57) ABSTRACT

An electronic device includes a main body, a panel mounted on the main body, and a substrate disposed between the main body and the panel. The substrate is configured for carrying touch sensors, and is connected to the panel. The electronic device further includes elastic arms extended from the main body, bearing resilient against the substrate. The touch sensors are mounted in the electronic device reliably.

7 Claims, 4 Drawing Sheets

ELECTRONIC DEVICE CONFIGURED TO RECEIVE TOUCH SENSOR

BACKGROUND

1. Technical Field

The disclosure relates to an electronic device and, particularly, relates to an electronic device configured to securely receive a touch sensor.

2. General Background

Touch sensors are widely used in electronic devices. For example, referring to FIG. 4, a keypad 2 includes a plurality of touch zones 1. Touch sensors 3, 4 are attached beneath the touch zones 1 to detect the touch of a finger F and generate inputs correspondingly. The touch sensor 3 further connects to a flexural oscillator 7 via a coupling body 6. Connection between the touch sensors 3, 4 and the keypad 2 may loosen over time because of aging or the movement of the flexural oscillator 7, and the touch sensors 3, 4 become less sensitive.

Thus, what is needed is an electronic device with reliable mounting means for touch sensors.

BRIEF DESCRIPTION OF THE DRAWINGS

The elements in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
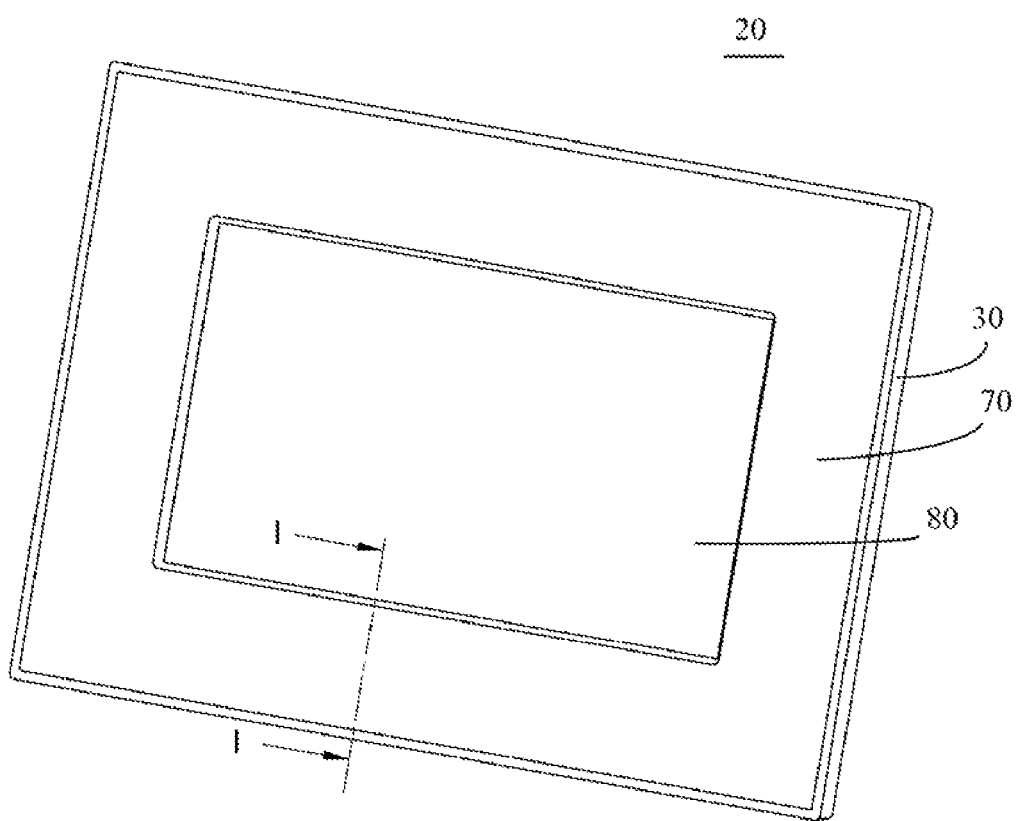
FIG. 1 is a schematic, isometric view of an electronic device according to an exemplary embodiment.
Figure 2:
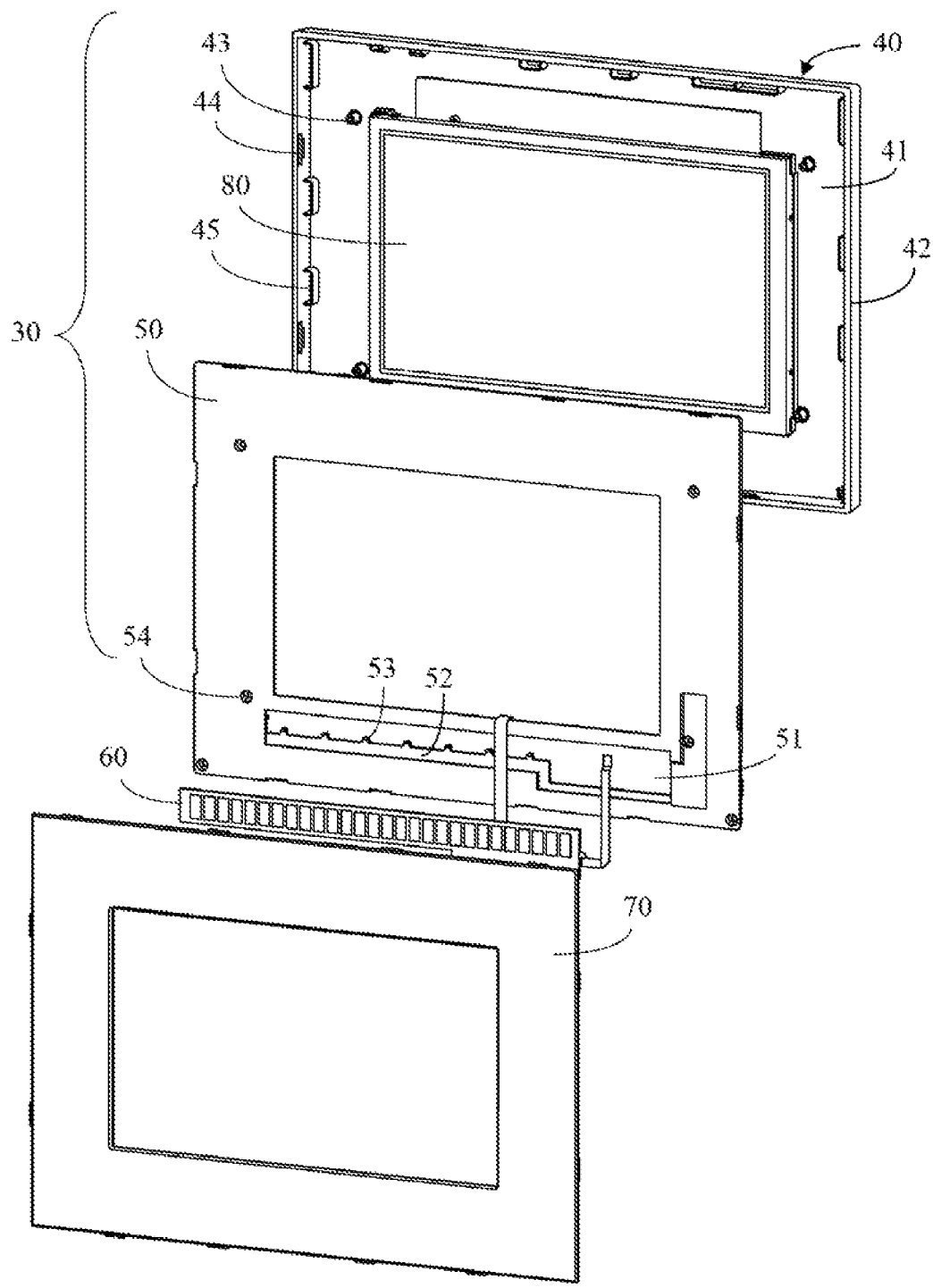
FIG. 2 is an exploded view of the electronic device of FIG. 1.
Figure 3:
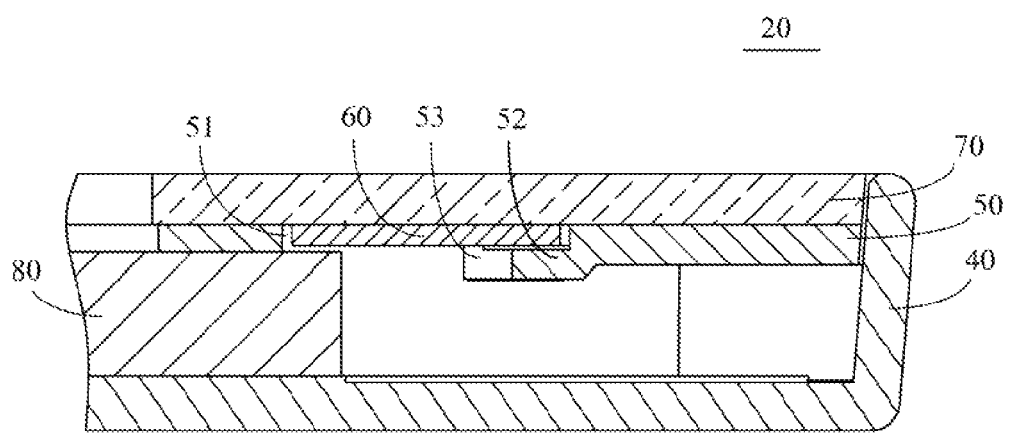
FIG. 3 is an enlarged section view of a part of the electronic device of FIG. 1, taken along the line I-I in FIG. 1.
Figure 4:
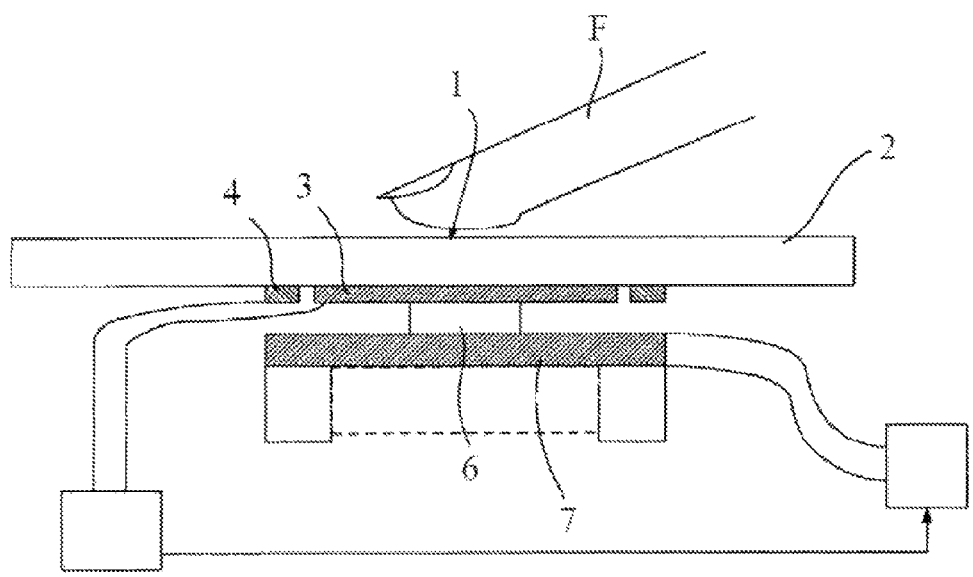
FIG. 4 shows a schematic view of a typical keypad with touch sensors in the related art.

Referring to FIG. 1, an electronic device 20 is disclosed. Referring to FIG. 2, the electronic device 20 includes a main body 30, a panel 70, and a substrate 60 for carrying touch sensors (not shown). The main body 30 includes a case 40, a front cover 50, and a display unit 80 received in the case 40. The substrate 60 is disposed between the panel 70 and the front cover 50.

The case 40 includes a base wall 41 and a sidewall 42 extending upwardly from the base wall 41. A plurality of sockets 45 is disposed longitudinally on the sidewall 42 facing the interior of the case 40 and near to one edge of the sidewall 42, and a plurality of slots 44 is defined on an opposite edge on the same side of the sidewall 42.

The front cover 50 includes a plurality of hooks (not shown) extending outwardly from the periphery thereof. The hooks are engagable in the sockets 45, and prevent the front cover 50 from being deformed. Screws (not shown) pass through holes 54 defined in the front cover 50 and holes 43 defined in the case 40, for connecting the front cover 50 to the case 40.

The panel 70 includes a plurality of hooks (not shown) extending from the periphery thereof. The hooks are engagable in the slots 44, and prevent the panel 70 from being deformed. The panel 70 is connected to the front cover 50 by any suitable such as with adhesive.

The front cover 50 defines an opening 51. The substrate 60 is disposed in the opening 51, and is further connected to the panel 70 with adhesive. A projection 52 beneath the substrate 60 extends from a wall bounding the opening 51. Elastic arms 53 extend from the projection 52, and resiliently press against a middle portion of the substrate 60. The substrate 60 tightly contacts the panel 70, thus, touch sensors on the substrate 60 can remain sensitive to touch over time.

Moreover, it is to be understood that the invention may be embodied in other forms without departing from the spirit thereof. Thus, the present examples and embodiments are to be considered in all respects as illustrative and not restrictive, and the invention is not to be limited to the details given herein.

What is claimed is:

1. An electronic device comprising:
   a main body comprising a front cover;
   a panel mounted on the main body;
   a substrate disposed between the main body and the panel, wherein the substrate is configured for carrying touch sensors, and is connected to the panel; and
   a plurality of elastic arms extended from the front cover and integrally formed therewith, bearing resiliently against the substrate.

2. The electronic device of claim 1, wherein the main body comprises a case and front cover is mounted thereon.

3. The electronic device of claim 2, wherein the case comprises a base wall and a sidewall extending upwardly from the base wall.

4. The electronic device of claim 3, wherein a side of the sidewall defines a plurality of sockets thereupon, and the periphery of the front cover defines a plurality of hooks extending therefrom corresponding to the plurality of sockets and engagable in the plurality of sockets so as to keep the front cover from being deformed.

5. The electronic device of claim 2, wherein the panel is connected to the front cover with adhesive.

6. The electronic device of claim 3, wherein a side of the sidewall defines a plurality of slots thereupon, and a plurality of hooks extending from the periphery of the panel are engagable in the slots so as to keep the panel from being deformed.

7. The electronic device of claim 1, wherein the main body defines an opening for receiving the substrate.

* * * * *